(12) United States Patent
Amemiya et al.

(10) Patent No.: US 8,158,716 B2
(45) Date of Patent: Apr. 17, 2012

(54) PREPARATION OF HYDROLYZABLE GROUP-CONTAINING ORGANOHYDROGENPOLYSILOXANE AND ORGANOPOLYSILOXANE DERIVED THEREFROM

(75) Inventors: Masahiro Amemiya, Annaka (JP); Hitoshi Uehara, Annaka (JP); Muneo Kudo, Annaka (JP); Mitsuo Asai, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 188 days.

(21) Appl. No.: 12/504,019

(22) Filed: Jul. 16, 2009

(65) Prior Publication Data

US 2010/0022705 A1 Jan. 28, 2010

(30) Foreign Application Priority Data

Jul. 25, 2008 (JP) ................................ 2008-191741

(51) Int. Cl.
*C08L 83/04* (2006.01)
*C08G 77/12* (2006.01)
(52) U.S. Cl. .......................................... 524/588; 528/31
(58) Field of Classification Search .................. None
See application file for complete search history.

(56) References Cited

U.S. PATENT DOCUMENTS

| | | | | |
|---|---|---|---|---|
| 4,339,564 A * | 7/1982 | Okamura | .......................... | 528/15 |
| 4,616,076 A * | 10/1986 | Ona et al. | .......................... | 528/15 |
| 4,684,709 A * | 8/1987 | Ona et al. | .......................... | 528/15 |
| 4,722,987 A * | 2/1988 | Ikeno et al. | ...................... | 528/23 |
| 4,774,310 A * | 9/1988 | Butler | .............................. | 528/23 |
| 5,145,934 A * | 9/1992 | Kobayashi et al. | .............. | 528/23 |
| 5,256,754 A * | 10/1993 | Takarada et al. | ................. | 528/31 |
| 5,332,796 A * | 7/1994 | Yoshikawa et al. | .............. | 528/15 |
| 5,466,532 A * | 11/1995 | Wengrovius et al. | .......... | 428/447 |
| 5,472,987 A | 12/1995 | Reedy et al. | | |
| 6,071,977 A * | 6/2000 | Austin et al. | ................... | 521/112 |
| 6,204,350 B1 * | 3/2001 | Liu et al. | .......................... | 528/23 |
| 6,399,210 B1 | 6/2002 | Zhong | | |
| 2005/0277730 A1 * | 12/2005 | Boisson et al. | ................ | 524/588 |

FOREIGN PATENT DOCUMENTS

| | | |
|---|---|---|
| DE | 4013281 A1 | 10/1991 |
| EP | 0520392 A1 | 12/1992 |
| JP | 2006160706 A * | 6/2006 |

OTHER PUBLICATIONS

Machine translation of JP-2006160706, translation generated on Jun. 15, 2011, 9 pages.*
European Search Report dated Nov. 11, 2009, issued in corresponding European Patent Application No. 09251831.

* cited by examiner

*Primary Examiner* — Robert Loewe
(74) *Attorney, Agent, or Firm* — Westerman, Hattori, Daniels & Adrian, LLP

(57) ABSTRACT

A hydrolyzable group-containing organohydrogenpolysiloxane is prepared by (A) reacting (a) an organosiloxane with (b) an organosilane or organosiloxane containing a hydrolyzable group, at least one of components (a) and (b) containing hydrosilyl, in the presence of a superstrong acid catalyst, (B) adding an inorganic basic neutralizing agent and/or an adsorbent to the resulting reaction solution, and (C) removing the neutralized and/or adsorbed form of the superstrong acid catalyst. The process proceeds in an essentially non-aqueous system, and the organohydrogenpolysiloxane free of residual acidic catalyst is obtainable at low cost.

6 Claims, No Drawings

PREPARATION OF HYDROLYZABLE GROUP-CONTAINING ORGANOHYDROGENPOLYSILOXANE AND ORGANOPOLYSILOXANE DERIVED THEREFROM

CROSS-REFERENCE TO RELATED APPLICATION

This non-provisional application claims priority under 35 U.S.C. §119(a) on Patent Application No. 2008-191741 filed in Japan on Jul. 25, 2008, the entire contents of which are hereby incorporated by reference.

TECHNICAL FIELD

This invention relates to a method for preparing an organohydrogenpolysiloxane having an alkoxysilyl or similar hydrolyzable group bonded to a silicon atom, and an organopolysiloxane obtained through addition reaction of the organohydrogenpolysiloxane with an unsaturated bond-containing organic compound.

BACKGROUND ART

In the prior art, organohydrogenpolysiloxanes are generally prepared by effecting equilibration reaction between a hydrosilyl-containing organosiloxane and another organosiloxane in the presence of an acidic catalyst, then neutralizing the catalyst, and recovering the end product via filtration and purification. Since a large amount of the acidic catalyst is necessary for equilibration reaction under acidic conditions, this process requires cumbersome treatment subsequent to the equilibration reaction. Specifically, the reaction solution must be washed with water to remove most of the acid and then treated with a neutralizing agent for complete removal of the acid. Also, when an organohydrogenpolysiloxane having alkoxy groups in a molecule is synthesized by this process, a problem arises that alkoxysilyl groups undergo hydrolysis during water washing. If neutralization is effected in a non-aqueous system to avoid hydrolysis, a greater amount of neutralizing agent is necessary, giving rise to problems including time-consuming removal of the neutralized salt and left-over of acid residues (e.g., sulfur, halogen, and phosphorus) in the organohydrogenpolysiloxane after neutralization because complete removal of such residues is difficult.

The organohydrogenpolysiloxane may then be reacted with an organic compound having an unsaturated group in the presence of a platinum catalyst according to a hydrosilylation reaction scheme:

thereby producing an organopolysiloxane having useful organic groups as disclosed in U.S. Pat. No. 5,472,987 (EP 0520392A1 or JP 2599237). Using this technique, an organopolysiloxane having both an alkoxy group and another useful organic group can be prepared.

One exemplary procedure starts with an organohydrogenpolysiloxane containing alkoxy groups represented by formula (A) and an organic compound having an unsaturated group represented by formula (B), thus producing an organopolysiloxane having both alkoxy groups and another organic group represented by formula (C).

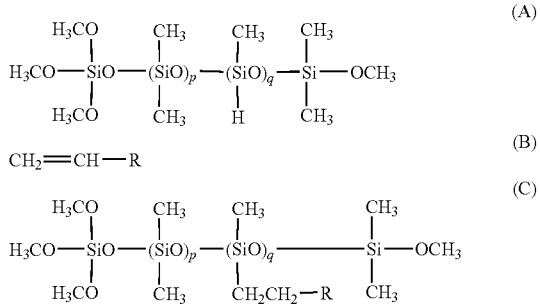

Herein R is hydrogen or an arbitrary organic group, p and q are natural numbers.

Since this hydrosilylation reaction proceeds in the presence of a platinum catalyst, the conversion is reduced in the presence of catalyst poisons such as acid residues (e.g., sulfur, halogen, and phosphorus). In the preparation of organohydrogenpolysiloxane, it is thus essential to remove the entirety of the acidic catalyst after the completion of equilibration reaction.

CITATION LIST

Patent Document 1: U.S. Pat. No. 5,472,987 (EP 0520392A1 or JP 2599237)

SUMMARY OF INVENTION

An object of the invention is to provide a method for preparing an organohydrogenpolysiloxane having hydrolyzable groups, typically alkoxy, in an essentially non-aqueous system so that the product may contain no residual acidic catalyst. Another object is to provide an organopolysiloxane obtained through addition reaction of the resulting organohydrogenpolysiloxane with an unsaturated bond-containing organic compound.

Regarding the preparation of an organohydrogenpolysiloxane through equilibration reaction between organosiloxanes in the presence of an acidic catalyst, the inventors have found that the amount of acidic catalyst added can be minimized using a superstrong acid as the acidic catalyst. When the neutralizing treatment is followed by equilibration reaction, previous water washing to remove most of the acidic catalyst becomes unnecessary because the catalyst can be completely removed by direct neutralization with a small amount of a specific basic neutralizing agent and filtration. The organohydrogenpolysiloxane is thus prepared in an essentially non-aqueous system. Even when the organohydrogenpolysiloxane contains alkoxy groups as the hydrolyzable group, the alkoxysilyl groups are not subject to hydrolysis. Thus an organohydrogenpolysiloxane containing hydrolyzable groups such as alkoxy groups in a molecule can be advantageously synthesized. The resulting organohydrogenpolysiloxane is free from acid residues (e.g., sulfur, halogen, and phosphorus) which can poison the catalyst for subsequent hydrosilylation reaction. Thus efficient hydrosilylation takes place between it and an unsaturated double bond-containing compound, yielding an organopolysiloxane having both a hydrolyzable group such as alkoxy and a useful organic group.

In one aspect, the invention provides a method for preparing a hydrolyzable group-containing organohydrogenpolysiloxane, comprising at least the steps of:

(A) reacting (a) at least one organosiloxane free of a hydrolyzable group in a molecule with (b) an organosilane or organosiloxane containing at least one hydrolyzable group in a molecule, at least one of components (a) and (b) containing a hydrosilyl group, in the presence of a superstrong acid catalyst and in the substantial absence of water to form a hydrolyzable group-containing organohydrogenpolysiloxane in a reaction solution, (B) adding an inorganic basic neutralizing agent containing an element of Group 2 and/or 13 in the Periodic Table and/or an adsorbent to the reaction solution for neutralizing and/or adsorbing the superstrong acid catalyst, and (C) removing the neutralized and/or adsorbed form of the superstrong acid catalyst.

In step (A), components (a) and (b) are preferably used in a weight ratio between 1:0.01 and 1:50. In step (B), the neutralizing agent and/or the adsorbent is preferably added in an amount of 0.001 to 1 part by weight per 100 parts by weight of components (a) and (b) combined. A typical hydrolyzable group is an alkoxy or acyloxy group.

In a preferred embodiment, the organosiloxane (a) is a cyclic organosiloxane of the general formula (1) or a chain-like organosiloxane of the general formula (2):

$$(R^1R^2SiO)_m \tag{1}$$

$$R^3R^4R^5SiO\text{---}(R^6R^7SiO)_n\text{---}SiR^8R^9R^{10} \tag{2}$$

wherein $R^1$ to $R^{10}$ are each independently hydrogen or an optionally substituted monovalent hydrocarbon group of 1 to 10 carbon atoms, m is an integer of at least 3, and n is an integer inclusive of 0.

In another preferred embodiment, the organosilane or organosiloxane (b) is a silane compound having at least one alkoxysilyl group in a molecule, represented by the general formula (3):

$$R^{11}R^{12}R^{13}R^{14}Si \tag{3}$$

wherein $R^{11}$ is an alkoxy group of 1 to 10 carbon atoms, $R^{12}$, $R^{13}$ and $R^{14}$ are each independently hydrogen, hydroxyl, an optionally substituted monovalent hydrocarbon group of 1 to 10 carbon atoms, or an alkoxy group of 1 to 10 carbon atoms, or a partial hydrolytic condensate thereof.

A typical superstrong acid catalyst is trifluoromethanesulfonic acid and/or fluorosulfonic acid. The preferred neutralizing agent and/or adsorbent is $Mg_6Al_2(OH)_{16}CO_3 \cdot 4H_2O$.

In another aspect, the invention provides an organopolysiloxane which is obtained through addition reaction of a hydrolyzable group-containing organohydrogenpolysiloxane prepared by the method of any one of claims 1 to 8 and at least one unsaturated bond-containing organic compound having the general formula (4):

$$CH_2\text{=}CH\text{---}R^{15} \tag{4}$$

wherein $R^{15}$ is hydrogen or an organic group.

The organic compound of formula (4) is preferably selected from the following general formulae (5) to (10).

$$CH_2\text{=}CH\text{---}C_aH_{2a+1} \tag{5}$$

Herein a is a positive integer.

$$CH_2\text{=}CH\text{---}CH_2\text{---}O\text{---}(C_bH_{2b}O)_c R^{16} \tag{6}$$

Herein b is 2 or 3, c is a natural number, and $R^{16}$ is hydrogen or $CH_3$.

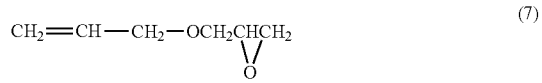

$$CH_2\text{=}CH\text{---}CH_2\text{---}OCH_2CHCH_2 \atop \diagdown\!\!\diagup \atop O \tag{7}$$

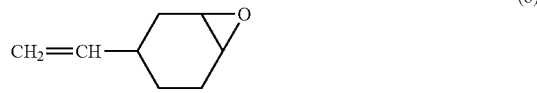

(8)

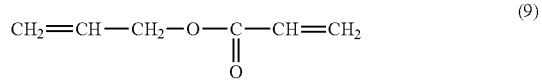

$$CH_2\text{=}CH\text{---}CH_2\text{---}O\text{---}\underset{\underset{O}{\parallel}}{C}\text{---}CH\text{=}CH_2 \tag{9}$$

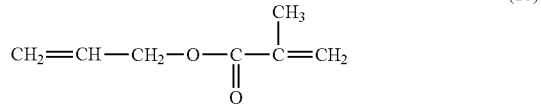

$$CH_2\text{=}CH\text{---}CH_2\text{---}O\text{---}\underset{\underset{O}{\parallel}}{\overset{CH_3}{\underset{|}{C}}}\text{---}\overset{}{C}\text{=}CH_2 \tag{10}$$

ADVANTAGEOUS EFFECTS OF INVENTION

In the method for the preparation of an organohydrogenpolysiloxane according to the invention, the use of a superstrong acid catalyst allows equilibration reaction to proceed with a minimized amount of catalyst added. In the neutralizing treatment following equilibration reaction, previous water washing to remove most of the catalyst becomes unnecessary. That is, the catalyst can be completely removed by direct neutralization with a small amount of a specific solid basic neutralizing agent and filtration, ensuring that the organohydrogenpolysiloxane is prepared in an essentially non-aqueous system. Even when alkoxy groups are contained as the hydrolyzable group, the alkoxysilyl groups do not undergo hydrolysis. Thus an organohydrogenpolysiloxane containing alkoxy groups in a molecule can be advantageously synthesized. Since acid residues (e.g., sulfur, halogen, and phosphorus) which can poison the catalyst for hydrosilylation reaction are not left in the resulting organohydrogenpolysiloxane, it is prone to hydrosilylation with an unsaturated double bond-containing compound to form an organopolysiloxane having both an alkoxy group and a useful organic group.

DESCRIPTION OF EMBODIMENTS

The method of preparing an organohydrogenpolysiloxane containing a hydrolyzable group such as alkoxy according to the invention comprises the steps of:

(A) effecting equilibration reaction between (a) at least one organosiloxane free of a hydrolyzable group in a molecule with (b) an organosilane or organosiloxane containing at least one hydrolyzable group in a molecule, at least one of components (a) and (b) containing a hydrosilyl group, in the presence of a superstrong acid catalyst and in the substantial absence of water to form a hydrolyzable group-containing organohydrogenpolysiloxane in a reaction solution, (B) adding a basic neutralizing agent containing an element of Group 2 and/or 13 in the Periodic Table and/or an adsorbent to the reaction solution of step (A) for neutralizing and/or adsorbing the superstrong acid catalyst, and (C) removing the neutralized and/or adsorbed form of the superstrong acid catalyst.

Step (A) is to effect equilibration reaction in the substantial absence of water and subsequent steps (B) and (C), as a matter of course, conduct treatments in the substantial absence of water. As used herein, the substantial absence of water means that a system contains no more than 0.5% by weight of water, especially no more than 0.05% by weight of water.

Component (a) is an organosiloxane which is not particularly limited as long as no hydrolyzable group is contained in a molecule. Preferred are cyclic organosiloxanes of the general formula (1) and chain-like organosiloxanes of the general formula (2).

$$(R^1R^2SiO)_m \tag{1}$$

$$R^3R^4R^5SiO-(R^6R^7SiO)_n-SiR^8R^9R^{10} \tag{2}$$

Herein $R^1$ to $R^{10}$, which may be the same or different, stand for hydrogen or an optionally substituted monovalent hydrocarbon group of 1 to 10 carbon atoms, m is an integer of at least 3, and n is an integer inclusive of 0.

Of the groups represented by $R^1$ to $R^{10}$, examples of the monovalent $C_1$-$C_{10}$ hydrocarbon groups include alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl, xylyl and naphthyl; aralkyl groups such as benzyl, phenylethyl and phenylpropyl; and alkenyl groups such as vinyl, allyl, propenyl, isopropenyl, butenyl, hexenyl, cyclohexenyl, and octenyl. Suitable substituent groups which can substitute on the foregoing hydrocarbon groups include halogen atoms such as fluorine.

The subscript m is an integer of at least 3, preferably 3 to 10, and more preferably 3 to 6, and n is an integer inclusive of 0, preferably 0 to 50, and more preferably 0 to 10.

Component (a) should preferably have a kinematic viscosity at 25° C. of up to 0.1 $m^2$/s, and more preferably up to 0.05 $m^2$/s. A higher viscosity than this level may lead to less reactivity with component (b).

Examples of the organosiloxane include chain-like siloxanes such as dimethylhydrogenpolysiloxane and dimethylpolysiloxane, and cyclic siloxanes such as octamethylcyclotetrasiloxane and tetramethyltetrahydrocyclotetrasiloxane.

Component (b) is an organosilane or organosiloxane containing at least one hydrolyzable group in a molecule. Preferred are silane compounds having at least one alkoxysilyl group in a molecule, represented by the general formula (3) and partial hydrolytic condensates thereof.

$$R^{11}R^{12}R^{13}R^{14}Si \tag{3}$$

Herein $R^{11}$ is an alkoxy group of 1 to 10 carbon atoms, preferably 1 to 4 carbon atoms. $R^{12}$, $R^{13}$ and $R^{14}$ are each independently selected from hydrogen, hydroxyl, optionally substituted monovalent hydrocarbon groups of 1 to 10 carbon atoms, preferably 1 to 8 carbon atoms, and alkoxy groups of 1 to 10 carbon atoms, preferably 1 to 4 carbon atoms.

Examples of the $C_1$-$C_{10}$ alkoxy groups represented by $R^{11}$ to $R^{14}$ include methoxy, ethoxy, propoxy and butoxy. Examples of the optionally substituted monovalent $C_1$-$C_{10}$ hydrocarbon groups represented by $R^{12}$ to $R^{14}$ are the same as exemplified above for the optionally substituted monovalent $C_1$-$C_{10}$ hydrocarbon groups represented by $R^1$ to $R^{10}$.

Examples of the organosilane or organosiloxane include tetramethoxysilane, tetraethoxysilane, methyltrimethoxysilane, methyltriethoxysilane, dimethyldimethoxysilane, dimethyldiethoxysilane, trimethoxysilane, triethoxysilane, methyldimethoxysilane, methyldiethoxysilane, and partial hydrolytic condensates of the foregoing silanes alone or in a combination of two or more.

At least one of components (a) and (b) should contain a hydrosilyl (SiH) group. Components (a) and (b) are mixed such that a weight ratio of (a):(b) is preferably between 1:0.01 and 1:50, more preferably between 1:0.02 and 1:40, and even more preferably between 1:0.1 and 1:10.

In step (A), components (a) and (b) are reacted in the presence of a superstrong acid catalyst which is preferably used in an amount of 0.001 to 1 part, more preferably 0.005 to 0.5 part, and even more preferably 0.01 to 0.1 part by weight per 100 parts by weight of components (a) and (b) combined. Outside the range, smaller amounts of the superstrong acid catalyst may fail to drive equilibration reaction whereas larger amounts may make complicated the neutralizing treatment following the reaction.

The superstrong acid catalyst used herein is a catalyst having stronger acidity than sulfuric acid. Exemplary are trifluoromethanesulfonic acid and fluorosulfonic acid. Of these, trifluoromethanesulfonic acid is preferred because of high catalysis and effectiveness at relatively low temperature.

The temperature of equilibration reaction is not particularly limited although it is preferably room temperature to 150° C., and more preferably room temperature to 80° C. The time taken for equilibration is about 3 to 24 hours.

After the equilibration reaction is completed, the superstrong acid catalyst is removed in a non-aqueous system (step B). This step uses an basic neutralizing agent containing an element of Group 2 and/or 13 in the Periodic Table and/or an adsorbent for removing the catalyst.

Suitable basic neutralizing agents and adsorbents include oxides, carbonates and other compounds containing an element of Group 2 and/or 13 in the Periodic Table. Examples include inorganic oxides such as magnesium oxide, calcium oxide, and aluminum oxide, and crystalline layer compounds as represented by $Mg_6Al_2(OH)_{16}CO_3 \cdot 4H_2O$ and commercially available under the trade name of Kyoward 500 (Kyowa Chemical Industry Co., Ltd.), with the crystalline layer compounds like Kyoward 500 being preferred. In particular, inorganic compounds containing at least one element selected from Mg, Ca and Al are preferred.

The neutralizing agent and/or adsorbent may be used in any desired amount with which the system can be rendered neutral, and typically in an amount of 0.001 to 1 part by weight per 100 parts by weight of components (a) and (b) combined. More preferably, the neutralizing agent and/or adsorbent is used in an amount of 1 to 10 times, especially 2 to 6 times the weight of the superstrong acid catalyst added. Outside the range, smaller amounts of the neutralizing agent and/or adsorbent may result in short adsorption or removal of the catalyst whereas larger amounts meaning more than necessity may be a waste of cost and make complicated the removal of the neutralized and/or adsorbed form of the superstrong acid catalyst as will be described later.

After the neutralizing reaction, the neutralized and/or adsorbed form of the superstrong acid catalyst, which is solid, is removed by filtration (step C), yielding the desired hydrolyzable group-containing organohydrogenpolysiloxane. The hydrolyzable group-containing organohydrogenpolysiloxane contains at least one, preferably at least two, and more preferably at least three hydrosilyl (SiH) groups in a molecule. The number of hydrolyzable groups in the organohydrogenpolysiloxane is at least 1, and preferably at least 2.

The hydrolyzable group-containing organohydrogenpolysiloxane resulting from step C may be used directly in the subsequent step. Typically, it is mixed directly with at least one unsaturated bond-containing organic compound, a platinum catalyst, and an optional solvent. As the mixture is heated, hydrosilylation reaction takes place between the organohydrogenpolysiloxane and the at least one unsaturated bond-containing organic compound, yielding a desired organopolysiloxane.

The unsaturated bond-containing organic compound used herein is not particularly limited although preferred compounds have the general formula (4):

$$CH_2=CH-R^{15} \quad (4)$$

wherein $R^{15}$ is hydrogen or an organic group.

Exemplary organic groups of $R^{15}$ include alkyl and alkenyl groups of 1 to 40 carbon atoms whose main chain may be interrupted by an oxygen atom (alkyl may include polyether bonds), and reactive groups such as epoxy, acryloyl, and methacryloyl groups. An alkylene group of 1 to 40 carbon atoms, especially 1 to 6 carbon atoms may intervene between the reactive group and $CH_2=CH$.

Examples of the organic compound of formula (4) include those of the following general formulae (5) to (10), but are not limited thereto.

$$CH_2=CH-C_aH_{2a+1} \quad (5)$$

Herein a is a positive integer, preferably 1 to 40.

$$CH_2=CH-CH_2-O-(C_bH_{2b}O)_cR^{16} \quad (6)$$

Herein b is 2 or 3, c is a natural number, preferably 1 to 30, and $R^{16}$ is hydrogen or $CH_3$.

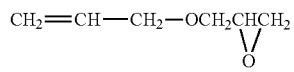

(7)

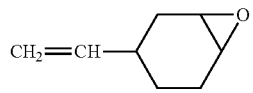

(8)

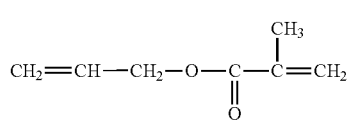

(9)

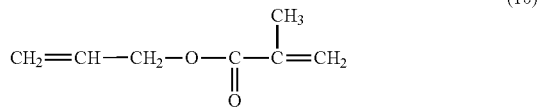

(10)

It is noted that the hydrosilylation reaction may be effected by any well-known techniques under ordinary conditions. For the reaction, the organohydrogenpolysiloxane and the unsaturated bond-containing organic compound are combined such that a molar ratio of SiH groups in the organohydrogenpolysiloxane to unsaturated bonds in the organic compound (i.e., SiH groups/unsaturated bonds) may range preferably from 0.5 to 2.0, more preferably from 0.7 to 1.5, and even more preferably from 0.8 to 1.2. The platinum catalyst is preferably used in such amounts to give 0.1 to 1,000 ppm, more preferably 1 to 500 ppm of platinum metal based on the total weight of the organohydrogenpolysiloxane and the unsaturated bond-containing organic compound. The hydrosilylation reaction may take place at room temperature to 150° C., specifically room temperature to 100° C.

EXAMPLE

Examples of the invention are given below by way of illustration and not by way of limitation.

Example 1

A 1-L three-neck flask fitted with a stirrer, thermometer and Dimroth condenser was charged with 296 g of octamethylcyclotetrasiloxane, 48 g of tetramethyltetrahydrocyclotetrasiloxane, and 15.2 g of tetramethoxysilane. Then 0.18 g (500 ppm) of trifluoromethanesulfonic acid was added to the mixture, which was stirred at 50° C. for 10 hours for reaction.

After the reaction terminated, the reaction system was allowed to cool to room temperature. To the system was added 1.08 g of a solid basic neutralizing agent $Mg_6Al_2(OH)_{16}CO_3 \cdot 4H_2O$ (trade name Kyoward 500 by Kyowa Chemical Industry Co., Ltd.). The system was stirred for 2 hours for neutralizing treatment of trifluoromethanesulfonic acid, and the product purified by filtration.

The sample as purified by filtration was analyzed by gel permeation chromatography (GPC), with the results shown in Table 1.

TABLE 1

| | | Peak holding time, min | Peak area ratio, % | |
|---|---|---|---|---|
| | | | Before reaction | After reaction |
| Reactants | Tetramethoxysilane | 38-40 | 5 | 0 |
| | Octamethylcyclotetrasiloxane | 31-37 | 95 | 13 |
| | Tetramethyltetrahydrocyclotetrasiloxane | | | |
| Equilibration product | | 21-31 | 0 | 87 |

At the end of reaction, the peak area of the equilibration product occupied about 90% of the overall area although some peaks assigned to the reactants were left behind. This demonstrated that equilibration reaction proceeded to a full extent even though a minimal amount of trifluoromethanesulfonic acid was added.

In a litmus paper test of liquid acidity, the sample indicated neutral, proving the completion of neutralization. On IR analysis, the sample showed a peak of $-OCH_3$ group, but not a peak of $-OH$ group. To determine the content of $-OCH_3$ group, the sample was analyzed by $^{29}Si$-NMR. The sample was estimated to contain 7.6 mol % of $-OCH_3$ group.

Next, 300 g of the sample obtained above was combined with 417 g of the compound: $CH_2=CH-CH_2-O(CH_2CH_2O)_{10}CH_3$ and 0.08 g of an ethanol solution of chloroplatinic acid (Pt concentration 3.0 wt %). With stirring, hydrosilylation reaction took place at 90° C. for 5 hours.

A $\equiv$SiH bond content of the sample was determined before and after the reaction. A 1-g portion of the sample was diluted with 10 g of butanol. With stirring, 20 g of a 20 wt % NaOH aqueous solution was added to the dilution. Hydrogen gas evolved from the reaction:

$$\equiv SiH + H_2O \rightarrow \equiv Si-OH + H_2 \uparrow.$$

From the amount of hydrogen gas evolved, the $\equiv$SiH content of the sample was determined. A percent conversion of hydrosilylation reaction is calculated according to the equation.

Conversion=[($\equiv$SiH content before reaction)−($\equiv$SiH content after reaction)]/($\equiv$SiH content before reaction)×100%

The results are shown in Table 2.

TABLE 2

| | Before reaction | After reaction |
|---|---|---|
| Hydrogen gas evolved (calcd. at 0° C.) | 50 cc | 2 cc |
| $\equiv$SiH content | $2.2 \times 10^{-3}$ mol | $8.9 \times 10^{-5}$ mol |
| Conversion | | 96% |

It is seen that by hydrosilylation reaction, 96% of ≡SiH are converted to ≡Si—C$_3$H$_6$O(CH$_2$CH$_2$O)$_{10}$CH$_3$.

Comparative Example 1

Equilibration reaction was carried out under the same conditions as in Example 1 except that 0.18 g (500 ppm) of methanesulfonic acid was used instead of trifluoromethanesulfonic acid.

The sample as purified by filtration was analyzed by GPC, with the results shown in Table 3.

TABLE 3

| | | Peak holding time, min | Peak area ratio, % | |
|---|---|---|---|---|
| | | | Before reaction | After reaction |
| Reactants | Tetramethoxysilane | 38-40 | 5 | 4 |
| | Octamethylcyclotetrasiloxane | 31-37 | 95 | 86 |
| | Tetramethyltetrahydrocyclo-tetrasiloxane | | | |
| Equilibration product | | 21-31 | 0 | 10 |

The peak area of the equilibration product occupied only about 10% of the overall area while the peaks assigned to the reactants occupied about 90%. This demonstrated that equilibration reaction little proceeded when methanesulfonic acid was used in a concentration of 500 ppm.

Comparative Example 2

Equilibration reaction was carried out under the same conditions as in Example 1 except that 11 g (3 wt %) of methanesulfonic acid was used instead of trifluoromethanesulfonic acid.

The sample as purified by filtration was analyzed by GPC, with the results shown in Table 4.

TABLE 4

| | | Peak holding time, min | Peak area ratio, % | |
|---|---|---|---|---|
| | | | Before reaction | After reaction |
| Reactants | Tetramethoxysilane | 38-40 | 5 | 0 |
| | Octamethylcyclotetrasiloxane | 31-37 | 95 | 14 |
| | Tetramethyltetrahydrocyclo-tetrasiloxane | | | |
| Equilibration product | | 21-31 | 0 | 86 |

When 3 wt % of methanesulfonic acid was added, equilibration reaction proceeded so that the peak area of the equilibration product exceeded 80% of the overall area.

In a litmus paper test of liquid acidity, the sample indicated acidic. It was then attempted to remove the methanesulfonic acid by water washing. Specifically, the system was combined with 140 g of water, stirred at room temperature for 2 hours, and allowed to stand for separation of the waste acid. During the water washing step, the sample increased its viscosity and eventually gelled. It is believed that as water was added in the presence of methanesulfonic acid, alkoxy groups underwent hydrolytic condensation.

Comparative Example 3

The procedure of Example 1 was repeated except that the neutralizing agent, Mg$_6$Al$_2$(OH)$_{16}$CO$_3$.4H$_2$O was replaced by a 10-fold amount (10.8 g) of NaHCO$_3$.

In a litmus paper test of liquid acidity, the sample as purified by filtration indicated acidic, proving neutralization incomplete.

Japanese Patent Application No. 2008-191741 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing an organopolysiloxane, comprising the steps of:
   (A) reacting (a) at least one organosiloxane free of a hydrolyzable group in a molecule with (b) an organosilane containing at least one hydrolyzable group in a molecule, said organosiloxane (a) being a cyclic organosiloxane of the general formula (1):

$$(R^1R^2SiO)_m \quad (1)$$

or a chain-like organosiloxane of the general formula (2):

$$R^3R^4R^5SiO-(R^6R^7SiO)_n-SiR^8R^9R^{10} \quad (2)$$

wherein $R^1$ to $R^{10}$ are each independently hydrogen or an optionally substituted monovalent hydrocarbon group of 1 to 10 carbon atoms, m is an integer of at least 3, and n is an integer inclusive of 0, said organosilane (b) being a silane compound having at least one alkoxysilyl group in a molecule, represented by the general formula (3):

$$R^{11}R^{12}R^{13}R^{14}Si \quad (3)$$

wherein $R^{11}$ is an alkoxy group of 1 to 10 carbon atoms, $R^{12}$, $R^{13}$ and $R^{14}$ are each independently hydrogen, hydroxyl, an optionally substituted monovalent hydrocarbon group of 1 to 10 carbon atoms, or an alkoxy group of 1 to 10 carbon atoms, or a partial hydrolytic condensate thereof, at least one of component (b) containing a hydrosilyl group, in the presence of a superstrong acid catalyst and in the substantial absence of water to form a hydrolyzable group-containing organohydrogenpolysiloxane in a reaction solution;
   (B) adding an inorganic basic neutralizing agent consisting of a crystalline layer compound containing at least one element selected from Mg and Al,
   (C) removing the neutralized form of the superstrong acid catalyst to prepare a hydrolyzable group-containing organohydrogenpolysiloxane, and
   (D) addition reacting the hydrolyzable group-containing organohydrogenpolysiloxane and at least one unsaturated bond-containing organic compound having the general formula (4):

$$CH_2=CH-R^{15} \quad (4)$$

wherein $R^{15}$ is hydrogen or an organic group.

2. The method of claim 1 wherein the organic compound of formula (4) is selected from the following general formulae (5) to (10):

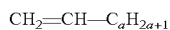  (5)

wherein a is a positive integer,

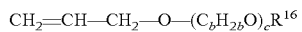  (6)

wherein b is 2 or 3, c is a natural number, and $R^{16}$ is hydrogen or $CH_3$,

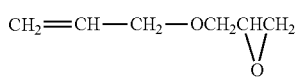  (7)

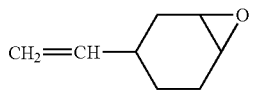  (8)

-continued

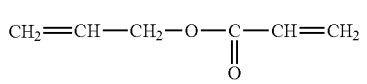  (9)

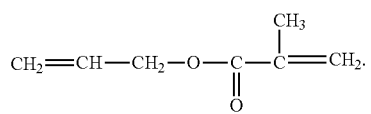  (10)

3. The method of claim 1 wherein in step (A), components (a) and (b) are used in a weight ratio between 1:0.01 and 1:50.

4. The method of claim 1 wherein in step (B), the neutralizing agent is added in an amount of 0.001 to 1 part by weight per 100 parts by weight of components (a) and (b) combined.

5. The method of claim 1 wherein the superstrong acid catalyst is trifluoromethanesulfonic acid and/or fluorosulfonic acid.

6. The method of claim 1 wherein the neutralizing agent is $Mg_6Al_2(OH)_{16}CO_3 \cdot 4H_2O$.

* * * * *